Dec. 6, 1966     C. L. ADAMS     3,289,404

LIQUID MONOPROPELLANT GAS GENERATOR

Filed Nov. 10, 1964

INVENTOR
Crestus L. Adams

BY    *R.J. Erickson*    AGENT

*signature*    ATTORNEY

3,289,404
LIQUID MONOPROPELLANT GAS GENERATOR
Crestus L. Adams, Bryans Road, Md., assignor to the United States of America as represented by the Secretary of the Navy
Filed Nov. 10, 1964, Ser. No. 410,322
9 Claims. (Cl. 60—39.48)

The invention described herein may be manufactured and used by or for the Government of the United States of America for governmental purposes without the payment of any royalties thereon or therefor.

The present invention relates to gas generators and more particularly to gas generators employing liquid monopropellants.

In the field of liquid monopropellant gas generators or reaction motors, numerous problems have been involved in the feeding and pumping of the monopropellant into the main combustion chamber of the gas generator. Previous attempts to solve these problems have required the use of complex hydraulic pumping systems for delivering the fuel to the combustion chamber or alternatively have required the use of high pressure gas stored within the generator for forcing the fuel into the combustion chamber. These prior art arrangements have not been entirely satisfactory because the mechanisms employed therein were extremely complex and expensive in manufacture and were not reliable in operation.

The general purpose of the present invention is to provide a liquid monopropellant gas generator which embraces all of the advantages of the previously employed liquid monopropellant gas generators but yet is simple in design, reliable in operation, and inexpensive to manufacture. To achieve this result, the gas generator of the present invention is so constructed as to be self-pressurizing and self-sustaining by utilizing pressure of the combustion gases produced by the ignition of the liquid monopropellant to pressurize the monopropellant and inject the monopropellant into the main combustion chamber and additionally to atomize and ignite the injected monopropellant.

An object of the present invention is the provision of a new and improved liquid monopropellant gas generator which is self-pressurizing and self-sustaining.

Another object of the invention is to provide a liquid monopropellant gas generator which is of simple design and inexpensive to manufacture and is reliable in operation.

A further object is to provide a liquid monopropellant gas generator in which the burning rate of the propellant may be readily varied and the propellant may be easily sampled and analyzed for periodic checking of the condition of the propellant.

A still further object is to provide a liquid monopropellant gas generator which is self-pressurizing and self-sustaining and may be readily re-filled and re-used.

Other objects and many of the attendant advantages of this invention will be readily appreciated as the same becomes better understood by reference to the following detailed description when considered in connection with the accompanying drawings in which like reference numerals designate like parts throughout the figures thereof and wherein.

Figure 1:
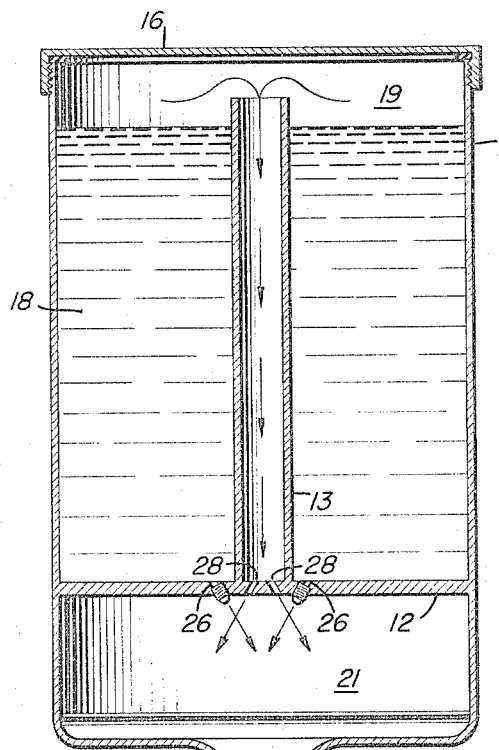
FIG. 1 illustrates a side elevation of a preferred embodiment of the invention.

The body of the gas generator as shown in FIGURE 1 is in the form of a cylindrical shell or tank 11 which has a transverse partition 12 formed therein to divide the tank into upper and lower chambers. The transverse partition 12 is in the form of a circular plate which divides the tank into an upper gas pressurizing and fuel receiving chamber and a lower main combustion chamber 21, the downwardly extending walls of the tank 11 being tapered to converge inwardly and diverge outwardly to form a thrust nozzle 14. Mounted upon the upper surface of the partition 12 is a stand pipe 13 which extends upwardly and terminates at its upper end just below the open end of the cylindrical tank. The open end of the cylindrical tank 11 is provided with screw threads to receive a threaded end closure cap 16 which provides a pressure tight closure for the tank 11 and may be readily removed to provide easy access into the interior of the tank. When the end closure 16 is removed, the tank may be filled with a liquid monopropellant 18 to any height below the top of the stand pipe 13.

Figure 3:
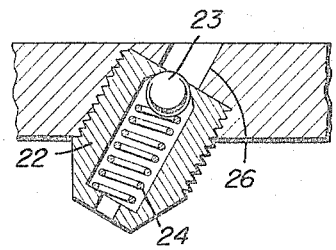
FIG. 3 illustrates the details of the check valves shown generally in FIGS. 1 and 2.

To provide efficient injection of the liquid monopropellant into the main combustion chamber 21, the circular base plate 12 is provided a plurality of through apertures 26 formed therein, said apertures being circumferentially disposed around the juncture of the stand pipe 13 with the plate 12. Each of these circumferentially disposed through apertures is provided with a pressure responsive fluid flow control means 22 such as a ball-type check valve, as shown in detail in FIGURE 3. Each check valve comprises an elongated hollow housing 22 having an inlet and an outlet and is externally threaded at its inlet end for mounting within the through apertures. Within each check valve housing is a ball element 23 which is resiliently biased against the inlet by means of a helical compression spring 24 to normally prevent the flow of fluid through the housing 22 at atmospheric pressures and to only permit the flow of fluid under pressure. By positioning one of these flow control members in each of said through apertures, it is possible to fill the tank with liquid monopropellant, as shown at 18, while preventing flow of the monopropellant into the combustion chamber 21 until the propellant has been ignited and becomes pressurized. Various other types of fluid flow control means may be employed in the through apertures 26 to permit only the flow of pressurized fluid therethrough, such alternatives being frangible diaphragms, frangible discs, blow-out plugs, and even slugs of silicon grease may be used satisfactorily under most conditions. A second set of through apertures 28 are formed in partition 12 to provide fluid communication between the interior of the stand pipe 13 and the main combustion chamber 21.

In operation, the gas generator is filled with liquid monopropellant to the level shown and the threaded end closure cap is threaded onto the open end of tank 11 to provide a pressure tight closure therefor. To ignite the monopropellant and place the system in operation, a pair of electrodes, not shown, may be positioned just below the surface of the monopropellant to create a spark between the electrodes causing the surface ignition of the monopropellant. As the monopropellant burns at the surface thereof, the combustion gases produced by the surface burning accumulate within the pressurizing zone 19 to pressurize the liquid monopropellant and thereby unseat the balls 23 from their flow preventing positions in the check valves 22 and thereby permit flow of the monopropellant through the check valves and into the main combustion chamber. As the upper surface of the liquid monopropellant continues to burn, the combustion gases thereby produced continue to pressurize the liquid monopropellant while some of the hot combustion gases enter the interior of the stand pipe 13 and flow downwardly through the stand pipe and the through apertures 28 formed in the plate and enter the main combustion chamber. Due to the fact that the liquid monopropellant injection nozzles 22 are arranged circumferentially about the stand pipe and are angularly orientated to direct a stream of monopropellant radially inwardly toward the axis of the tank, while the apertures 28 are angularly orientated to direct a stream of hot combustion gas downwardly and radially outwardly, it is apparent that the hot exhaust gases will be caused to impinge upon the stream of injected monopropellant. As the hot combustion gases impinge upon the injected monopropellant, the injected monopropellant is atomized and ignited by the hot gases to provide a continuous supply of combustion gases under high pressure within the main combustion chamber 21. The ignition of the liquid monopropellant to cause sustained surface burning of the propellant in the pressurizing zone 19 creates a continuous supply of hot combustion gases which serve the dual purpose of pressurizing the monopropellant to inject the monopropellant into the main combustion chamber 21 and further to atomize and ignite the injected monopropellant in the main combustion chamber as a portion of the hot combustion gases flow from the pressurizing zone 19 through the stand pipe 13 and into the main combustion chamber. The gas generating system herein disclosed is therefore seen to be self-pressurizing and self-sustaining until the supply of liquid monopropellant 18 has been completely exhausted. The gas generator of FIGURE 1 is proven to be highly efficient and reliable in its operation while being extremely simple in construction and requiring a minimum number of parts.

Figure 2:
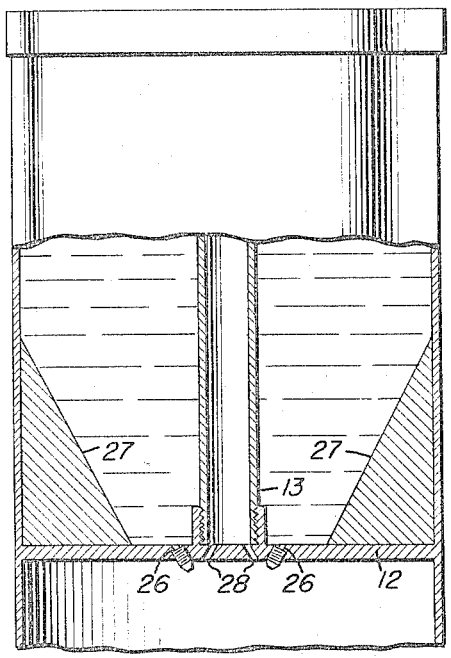
FIG. 2 illustrates an exploded view of the invention showing additional features thereof.

Referring to FIGURE 2, there is shown a gas generator constructed similar to and functioning in the same manner as the generator disclosed in FIGURE 1. In the gas generator of FIGURE 2, however, various alternatives are disclosed for varying the pressure profile of the generator during its firing cycle. From the description of the FIGURE 1 device, it is apparent that the pressure developed in the pressurizing zone 19 controls the rate of flow of liquid monopropellant through the injection nozzles 22, and that the pressure within zone 19 is determined by the surface area of the liquid monopropellant within the tank 11. In order to change the pressure profile or pressure-time curve of the gas generator, the device of FIGURE 2 discloses alternative means which may be employed to vary the area of surface ignition of the monopropellant 18 within the tank 11. The area of surface ignition of the monopropellant may be selectively controlled by placing angular inserts having varying thickness within the interior of the tank, such as the insert shown at 27. The particular insert shown in FIGURE 2 provides a means for uniformly decreasing the area of surface ignition of the monopropellant as the level of the propellant decreases during burning and thereby gradually decreases the tank pressure and the outlet pressure of the gas generated by the system. It is within the scope of this invention to provide a number of interchangeable tank inserts, each having a different cross-sectional configuration so that each provides a different pressure profile or pressure-time characteristic for the gas generator. Another method of varying the pressure profile of the gas generator is to control the cross-section of the stand pipe. As seen in FIGURE 2, the stand pipe 13 is threadedly mounted in a boss formed in the partition 12 and may be readily replaced by interchangeable stand pipes. It is therefore possible selectively to utilize stand pipes having a uniform internal diameter but having a varying external diameter to thereby change the area of surface ignition of the burning propellant in the pressurizing zone 19 to alter the pressure-time characteristic of the gas generator. It can be seen, therefore, that the gas generator of this invention may be modified to have nearly any predetermined pressure-time characteristic by selectively utilizing the proper combination of angular inserts 27 and stand pipes 13.

From the foregoing description, it is readily apparent that the present invention provides a gas generator which is very simple in construction and is extremely reliable and efficient in operation. Moreover, the gas generator of this invention is constructed in such a manner that it may be repeatedly re-filled and re-used. Through the use of interchangeable liners and stand pipes, the pressure profile of the gases produced by the present invention may be selectively varied to meet the changing requirements as they occur in the field without requiring extensive and costly modifications to the structure.

Obviously many modifications and variations of the present inventio nare possible in light of the above teachings. It is therefore to be understood that within the scope of the appended claims the invention may be practiced otherwise than as specifically described.

What is claimed is:
1. A liquid monopropellant gas generator comprising
   an elongated hollow tank having a normally closed upper end portion and a lower end portion,
   said tank having a transverse partition formed therein to divide the tank into upper and lower chambers,
   said partition having at least one through aperture formed therein to provide fluid communication between said upper and lower chambers,
   pressure responsive flow control means positioned within said through aperture to prevent flow of fluid from the upper chamber into the lower chamber at normal atmospheric pressures,
   conduit means providing fluid communication between said lower chamber and a zone in said upper chamber above the highest level of liquid monopropellant therein,
   means within the upper chamber for igniting a liquid monopropellant,
   whereby ignition of a liquid monopropellant with the upper chamber pressurizes the propellant to inject the propellant through the through aperture into the lower chamber and to conduct hot combustion gases through said conduit means to the main combustion chamber to ignite the injected propellant.
2. The gas generator defined in claim 1 wherein said conduit means comprises
   a hollow stand pipe mounted upon said transverse partition,
   said partition having a through aperture therein providing fluid communication between the interior of said stand pipe and said lower chamber.
3. The gas generator defined in claim 1 further comprising
   a removable insert of varying cross-section disposed within said upper chamber for changing the pressure profile of the gas generator.
4. The gas generator of claim 1 wherein said pressure responsive flow control means comprises a check valve.
5. The gas generator of claim 2 wherein said means for igniting a liquid monopropellant comprises
   a pair of spaced apart electrodes positioned just beneath the surface of said monopropellant and having electrical conductors extending therefrom to the exterior of said tank.
6. A liquid monopropellant gas generator comprising
   a cylindrical tank having a normally closed upper end portion and a lower end portion,
   a circular plate disposed transversely within said tank and being fixedly secured to the inner peripheral surface of said tank to divide the tank into a main combustion chamber immediately below the plate and a fuel receiving and pressurizing chamber above the plate,
   a stand pipe mounted upon said plate and extending upwardly toward said closed end portion, said plate having a first set of through apertures formed therein to provide fluid communication between the interior of the stand pipe and the main combustion chamber, said plate having a second set of through apertures formed therein to define fuel injection ports for fluid communication between the combustion chamber and said fuel receiving and pressurizing chamber, said injection ports having means therein for preventing flow of fuel therethrough at normal atmospheric pressures, and means within the fuel receiving and pressurizing chamber for igniting a liquid monopropellant therein, whereby ignition of the monopropellant causes surface burning thereof to produce combustion gases within the fuel receiving and pressurizing chamber which pressurize the propellant and inject the propellant into the main combustion chamber and pass through the stand pipe to ignite the injected propellant.

7. The gas generator defined in claim 6 wherein said first set of through apertures are angularly positioned to extend downwardly and radially outwardly, and said second set of through apertures are circumferentially disposed around said stand pipe and angularly orientated to extend downwardly and radially inwardly, whereby hot combustion gases pass through said first set of apertures to impinge upon streams of injected monopropellant from said second set of apertures to atomize and ignite said injected propellant.

8. The gas generator of claim 7 further comprising a removable end closure cap threaded to the upper end of said tank, and a removable liner positioned within said tank to vary the cross-section thereof, whereby the pressure profile of the gas generator may be selectively controlled.

9. The gas generator of claim 8 wherein the walls of said main combustion chamber are tapered to converge inwardly and diverge outwardly to define a thrust nozzle for said main combustion chamber.

References Cited by the Examiner

UNITED STATES PATENTS

| | | | |
|---|---|---|---|
| 2,918,791 | 12/1959 | Greiner | 60—35.6 |
| 3,011,312 | 12/1961 | Black | 60—39.48 |

MARK NEWMAN, *Primary Examiner.*

D. HART, *Assistant Examiner.*